(12) United States Patent
Fischer

(10) Patent No.: US 6,820,535 B2
(45) Date of Patent: Nov. 23, 2004

(54) ESPRESSO BREWING DEVICE

(75) Inventor: Daniel Fischer, Romanshorn (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/473,398

(22) PCT Filed: Mar. 20, 2002

(86) PCT No.: PCT/EP02/03281
§ 371 (c)(1),
(2), (4) Date: Sep. 30, 2003

(87) PCT Pub. No.: WO02/078499
PCT Pub. Date: Oct. 10, 2002

(65) Prior Publication Data
US 2004/0112222 A1 Jun. 17, 2004

(30) Foreign Application Priority Data
Mar. 31, 2001 (DE) ..................... 201 05 672 U

(51) Int. Cl.⁷ .............................................. A47J 31/00
(52) U.S. Cl. .................. 99/289 R; 99/302 R; 99/443 R
(58) Field of Search ...................... 99/279, 386, 289 R, 99/289 T, 289 D, 443 R, 289 P, 295, 443 C, 302 R, 302 P, 177; 426/433

(56) References Cited

U.S. PATENT DOCUMENTS

| | | | | |
|---|---|---|---|---|
| 2,939,381 A | * | 6/1960 | McBride | 99/295 |
| 3,713,377 A | * | 1/1973 | Arnett et al. | 99/283 |
| 3,812,273 A | | 5/1974 | Schmidt | |
| 4,136,202 A | * | 1/1979 | Favre | 426/77 |
| 4,602,558 A | * | 7/1986 | Kaper et al. | 99/289 R |
| 4,724,752 A | | 2/1988 | Aliesch et al. | |
| 4,873,915 A | * | 10/1989 | Newman et al. | 99/289 R |
| 4,920,870 A | * | 5/1990 | Newman et al. | 99/289 R |
| 5,242,702 A | * | 9/1993 | Fond | 426/433 |
| 5,637,335 A | * | 6/1997 | Fond et al. | 426/84 |
| 6,095,032 A | * | 8/2000 | Barnett et al. | 99/286 |

FOREIGN PATENT DOCUMENTS

| | | |
|---|---|---|
| DE | 694 00 787 T2 | 2/1997 |
| DE | 696 02 713 T2 | 12/1999 |
| EP | 0 455 337 B1 | 11/1991 |
| EP | 1 002 490 A1 | 5/2000 |
| EP | 1 002 490 A | 5/2000 |
| FR | 1 564 088 A | 4/1969 |

* cited by examiner

Primary Examiner—Timothy F. Simone
(74) Attorney, Agent, or Firm—Venable LLP; Robert Kinberg

(57) ABSTRACT

An espresso brewing device with a brewing unit, a magazine able to rotate via an electric motor and equipped with a magazine table (17) supporting several magazine tubes (20) located along its circumference and open below for holding single-serving capsules (16) containing coffee powder is provided with means for the individual dispensing of single-serving capsules (16) into the brewing unit and with a control system for controlling the rotation of the magazine table (17) up to the point where a magazine tube (20) containing the desired coffee type is in the dispensing position. In order to facilitate access to functionally-important parts, particularly the magazine, that are housed securely inside a casing, the brewing unit, the capsule conveying device and the magazine are positioned on a support frame (45) whereby the magazine, supported by a magazine drawer (18), is able to be pulled out.

16 Claims, 3 Drawing Sheets

ESPRESSO BREWING DEVICE

Figure 1:
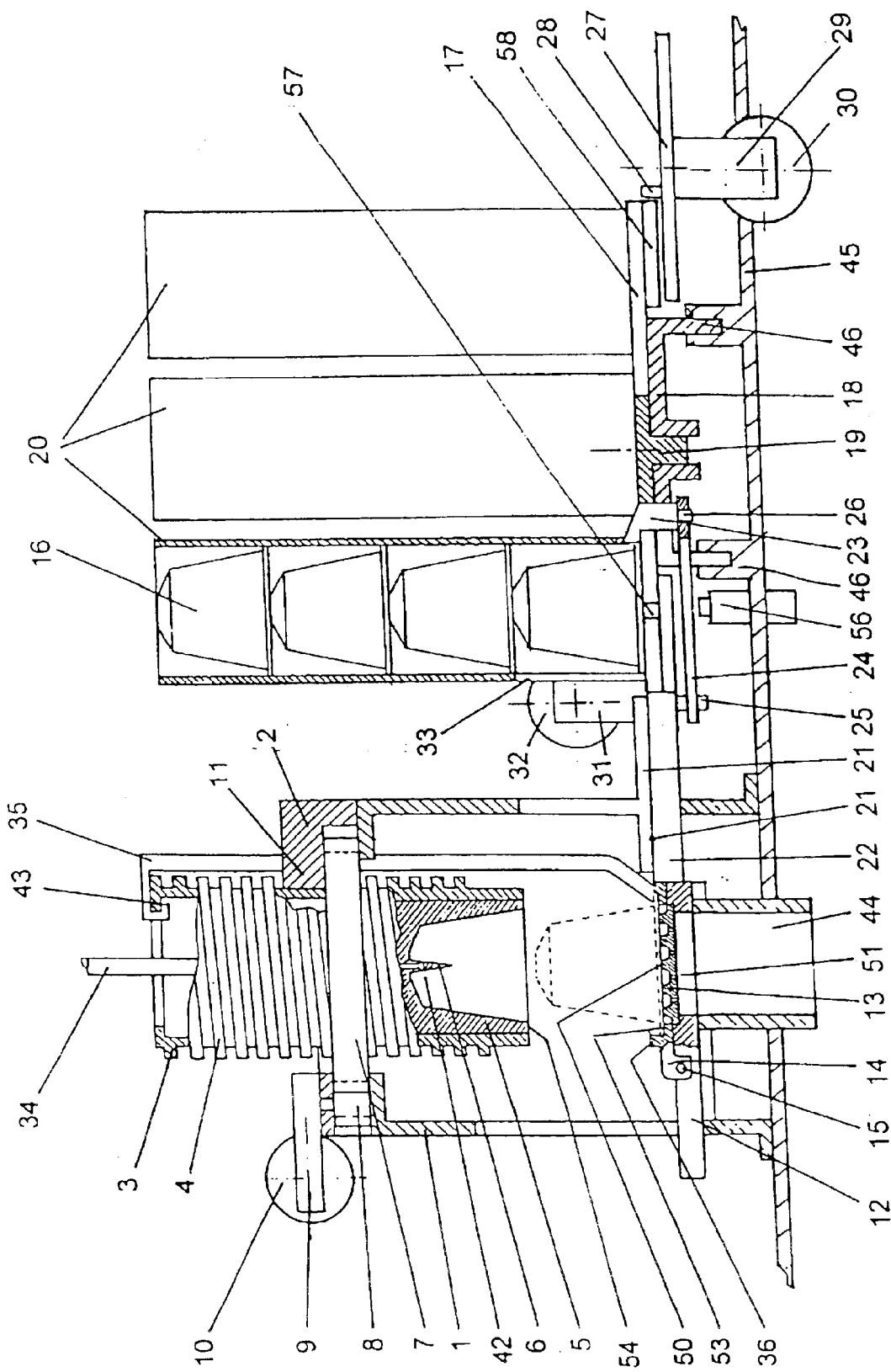

The invention concerns an espresso brewing device according to the generic term of claim 1.

Such an already-known espresso brewing device consists of a brewing unit, a rotatable magazine—also rotatable via an electric motor—with a magazine table whereupon several magazine tubes also termed cartouches for holding single-serving capsules containing coffee powder are arranged approximately in the circumferential direction of the magazine table (EP 1 460 366 A1). In order to feed the single-serving capsules individually into the brewing unit, a comparatively complicated lever mechanism coupled with an electronic magnet is provided. The lever mechanism acts upon swivel-mounted latches both of whose sides are provided with a supporting surface each for supporting an individual serving of coffee. The latches take hold of a projecting edge of the individual coffee servings that are stacked inside the magazine tubes with their edges and thus their bases facing upwards. When the lever mechanism is operated, the respective lowest single-serving capsule separates from the latches and drops into that part of the brewing chamber that was swivelled into position below the capsule, whereby the brewing chamber is an integral part of the brewing unit. In order to brew the coffee, the above-mentioned lower part of the brewing chamber must be swivelled to the upper part of the brewing chamber whose upper surface is equipped with a piston-shaped stopper with pyramid-like projections and openings. Subsequently a ram is raised from the lower surface of the lower part of the brewing chamber, entering the single-serving capsule in order to introduce hot water for brewing into the individual coffee serving. After breaking the top-side base of the individual coffee serving by means of the pyramid-shaped projections, the brewed coffee or espresso is able to flow out through the upper openings of the stopper. Subsequently the brewing chamber is conveyed back to its original position and the now empty single-serving capsule is ejected from the brewing chamber via the stopper that continues to rise. The swivel mechanism and operational mechanism of the brewing chamber and of the stopper able to move therein are relatively complicated. It is not clear just how the empty single-serving capsule is to be ejected completely, since a magazine tube is positioned right above when the brewing chamber is in its original position.—For the selection of a coffee type or rather a single-serving capsule containing the desired coffee type, each magazine tube is provided with a window permitting the consumer to visually recognize which coffee type is contained in the respective magazine tube, as well as recognize which coffee type is located above the brewing unit at this point and will be used next for brewing a cup of coffee. A colour identification, for example, is suggested as a means of recognizing the desired coffee type. However, it is also possible to provide each single-serving capsule with a code able to be registered electronically via a suitable reading device in order to recognize single-serving capsules and particularly their contents. This recognition is utilized, for example, to show via a display which type of coffee is being used to brew the next cup of coffee. A further variation includes a control panel for the selection of the desired coffee type whereby the magazine table is rotated by means of an electric motor until the respective magazine tube containing the selected coffee type is in the effective position above the brewing unit. The means for achieving this are not shown. Recognition of a code applied on the circumference of a single-serving capsule whereby the code could be scanned through a window appears difficult, if not impossible, while the recognition of a code on the base of the single-serving capsule, for example, is out of the question since the base is covered by the single-serving capsule stacked above it.

Another state-of-technology drink dispensing machine for drinks such as coffee or tea is provided with a magazine table carrying a number of magazine tubes arranged along its circumference and holding single-serving capsules (EP 1 002 490 A1). The magazine table can be rotated via a drive sysstem, also a Maltese-cross-type drive ssystem, in such a way that one magazine tube holding the desired single-serving capsules can be positioned adjacent to a water/steam supplying device. From this position the bottom capsule of the single-serving capsules stacked with their edge facing downwards can be pushed via a thrusting device into the position below the water/steam supplying device. The thrusting device used for this purpose is located entirely within the configuration of the magazine tubes centrally above the magazine table. Although this machine is not very high, the water/steam supplying device must be located closely adjacent to the configuration of the magazine tubes due to the arrangement of the thrusting device.

For the horizontal conveyance of single-serving capsules to be selected from a magazine with its magazine chambers arranged in a linear manner next to each other and to be conveyed into a brewing unit positioned adjacent to the magazine at a certain distance from it, the use of a conveyor band is already known, whereby the conveyor band is essentially located below the magazine chambers and is equipped with a delivery station for the horizontal delivery of a selected single-serving capsule from the conveyor band to the brewing unit (U.S. Pat. No. 3,812,273). The linear configuration of the magazine chambers, however, requires a correspondingly large extension of the entire assembly with regard to its breadth. In addition, conveyance and delivery of the selected single-serving capsule from the magazine to the brewing unit necessitate expensive technology.

In the case of another device for the brewing of beverages, a rotatable drum with an intake opening for a selected single-serving capsule is positioned below pipe-shaped magazine compartments wherein single-serving capsules are stacked with their base facing downwards (FR-A 1 564 088). The selected single-serving capsule is conveyed via the drum to an opening within a stationary plate bar through which the single-serving capsule is conveyed to another conveying device for its horizontal conveyance up to a beverage preparation unit, whereby the single-serving capsule is additionally tilted above this unit.—This assembly is complicated, since a selected single-serving capsule must not only be transported horizontally, but must also be released for its sectionally-controlled free drop, and must finally be tilted from its position inside the magazine where its base is facing downwards to the opposite position above the beverage preparation unit where its base is facing upwards.

As far as the coding of the single-serving capsule and control of the espresso brewing device is concerned, single-serving capsules or cartridges for the preparation of foamed beverages provided with at least a code or means of identification whereby the cartridge is identified when the brewing device is being used and whereby the cartridge or its contents are made to undergo the correct operational steps, are already part of the present state-of-technology, including the introduction of a watery medium inside the cartridge (DE 694 00 787 T2). The means of identification may include a bar code printed upon the body of the cartridge and able to be scanned via an optical device. The means of identification may also include one or several strips of a magnetic material able to be read by a magnetic sensor. Preferably, the device for preparing beverages is designed in such a way that the cartridge is processed automatically once it has been inserted into the device.

In general, the use of single-serving capsules provided with means of identification and the identification of those means in order to handle the single-serving unit and its contents correctly, and the introduction of liquid media into the capsule in particular, are revealed in EP 0 455 337 B1.

In the case of another already-known device for the preparation of a beverage using a sachet or single-serving capsule, various single-serving capsules are stored according to contents in different stationary channels that can be opened via one associated actuating button in order to remove a single-serving capsule (EP 0 334 573 B1). The manually-removed single-serving capsule is inserted into an opening below a brewing station in such a way that a micro switch is activated via the single-serving capsule in order to unblock the brewing process. Thus the micro switch serves to identify the correct position of the single-serving capsule before the watery medium is introduced.

It is the task of the present invention to further develop an espresso brewing unit of the generic type mentioned above, without considering its control system at the moment, in such a way that while the low height of the unit is maintained, the access to functionally important parts, particularly to the magazine serving to hold assorted stacks of single-serving capsules, is improved although these parts are positioned securely inside a casing.

This task being the base of the invention is basically implemented according to the characterising part of claim 1.

The magazine table drawer able to be pulled out of the supporting frame of the espresso brewing device supports the magazine table provided with magazine tubes positioned on top and with a pivot pin protruding below for mounting purposes inside the magazine drawer. For the control of its drive, the magazine table may be provided laterally with a zero setting reference mark, whereby a scanner contact or sensor is located in a stationary position on the magazine table drawer in order to scan the above-mentioned reference mark.—An advantage of the magazine table drawer is the fact that the magazine tubes can each be supplied easily from above with single-serving capsules of one particular coffee type. The magazine drawer can then be pushed back into the device wherein the magazine table drawer with its associated elements, especially the magazine tubes holding single-serving capsules, is secure and can be locked, if necessary. In addition, maintenance is simplified due to the fact that the magazine drawer can be pulled out.

In this context it is especially advantageous if the magazine table with the magazine tubes can be separated easily from the magazine table drawer. In this case several fairly basic magazine tables with magazine tubes containing single-serving capsules can be kept ready, so that they cab be interchanged quickly if necessary.

When various coffee types are kept ready for selection, each type must be stored in a different magazine tube in order to be identified. With regard to the further characteristics of the device, in particular the scanning or reading of codes on the magazine capsules via at least one sensor or scanner, the single-serving capsules are placed into the magazine tubes with their base, i.e. their bottom membrane, facing downwards. The brewing unit that is part of the espresso brewing device is further designed in such a way, as characterised below, that a single-serving capsule ori-ented as described above is able to undergo the brewing process after being conveyed horizontally without turning.

Preferably, according to claim 3 the magazine tubes are each provided, in a lower section of their casing that is raised above the magazine table, with a capsule magazine opening which opens radially outwards with regard to the magazine table. A sliding path for the capsule extends between the magazine table and the brewing unit, whereby one single-serving capsule at a time is able to slide, via a capsule gripper driven by an electric motor, from a magazine tube in the dispensing position up to the brewing unit. In the dispensing position the selected magazine is therefore rotated by the magazine table in such a way that the lowest of the single-serving capsules stacked with their bases facing downwards is conveyed via the capsule gripper through the capsule magazine opening of the magazine tube along the capsule slide path up to the brewing unit.

In order to guide the capsule gripper within the magazine table area when one single-serving capsule is being ejected, the area below each magazine tube is provided, according to claim 4, with a radially-extending capsule ejection slot extending up to the outer edge of the magazine table and open where it meets the edge. When one of the magazine tubes is in the dispensing position, the capsule ejection slot meets a capsule gripping guide formed within the capsule slide path and extending up to the brewing unit. In order to guide the single-serving capsules along the capsule slide path, the latter is provided with additional means in the shape of capsule guides arranges essentially parallel to the capsule gripping guide, whereby the distance between the two capsule guides is somewhat greater than the diameter of the single-serving capsule in the area of its base, i.e. its bottom membrane.

The capsule gripper is part of the capsule conveying device, and for the purpose of being operated according to claim 5 it is connected via a drive lever and drive mechanism elements with a capsule-conveying driving motor. The drive mechanism elements may include in particular a speed reduction gear located at the capsule-conveying driving motor, and a driving disc connected to the speed reduction gear, whereby the driving stud of the driving disc engages via a driving stud slot with the actuating lever in a sliding manner near one of its ends. The other end of the actuating lever, close to where the lever is mounted on a gripping stud, is provided with a capsule gripping slot wherein the capsule gripper is mounted in such a way that it is also able to slide. The entirety of the drive mechanism converts the rotation movement of the capsule-conveying driving motor into a linear guided movement of the capsule gripper.

When the design of the magazine is low and compact and it is mainly positioned adjacent to the brewing unit, the capsule-conveying device is designed in such a way that the single-serving units are conveyed only horizontally with their base facing downwards. The capsule-conveying device is essentially positioned between the magazine and the brewing unit.

For the actuation of the magazine table, i.e. in order to rotate a selected magazine tube into the dispensing position, the magazine table, according to claim 7, is in an actuation-connection with a Maltese-cross-type drive consisting of a driving motor, a drive mechanism and a Maltese-type disc with a driving stud and positioned below the magazine table on the support frame. Whenever the magazine table is in operation, the driving stud is positioned closely adjacent to one of several Maltese-type gripping flanks located at the lower surface of the magazine table. According to the arrangement of the Maltese-type gripping flanks, each of the magazine tubes positioned above can be shifted step by step into the dispensing position. When the magazine table drawer is pulled out, the Maltese-cross-type drive can be separated from the magazine table via removal of the Maltese-type gripping flank from the driving stud of the Maltese-cross-type drive. This is done easily, since the gripping flanks always assume a definite position according to the dispensing position of the magazine table.

For the purpose of its control, the magazine table should be provided with a zero setting reference mark able to be scanned, whereby this reference mark may be a cam, read mechanically via a controlled contact, or it may be a reference mark designed to be scanned optically or magnetically. The scanner of the zero setting reference mark and a two-direction meter counting all operational steps carried out by the magazine table in each direction of rotation, starting from a zero position of the magazine table, are part of an electronic position recognition device of the magazine table according to claim 9. This device is part of a logical control system controlling a set movement of a randomly selected magazine tube using the shortest possible path in one of the two possible directions of rotation into the dispensing position. The setting time can thus be minimized, whereby apart from a zero position signal or impulse from the zero setting reference mark, only counting impulses according to the steps carried out by the Maltese-cross-type drive are required additionally.

For additional control, or as an alternative to the above-mentioned control system, the magazine table is provided, according to claim 10, with transparent windows so that the base of a single-serving capsule can be scanned, whereby one window is located below each magazine tube. For this purpose at least one sensor/scanner is located below the magazine table at the path of movement of the windows able to rotate together with the magazine plate and directed towards the respective window. The base or a code applied to the base can be scanned through the window and can be converted into a corresponding impulse.

In particular, a sensor according to claim 11 may be located at the dispensing position, whereby the presence of a single-serving unit inside the magazine tube set in the dispensing position can be checked. Thus the possibility that a magazine tube associated with single-serving capsules, especially those containing a particular coffee type, has been set correctly but cannot supply a single-serving capsule to the brewing unit because it is empty can be prevented.

Instead, the magazine can already be checked while entering the dispensing position, not only to find out if there is at least one single-serving capsule in the corresponding dispensing tube, but also if that capsule contains the desired coffee type. This is done according to claim 12. For this purpose a scanner is located in front of the dispensing position in the direction of rotation of the magazine table, whereby a code relating to the coffee type and applied to the base of the lowest-positioned single-serving capsule contained in the selected magazine tube can be read. Thus it can already be determined during the searching part of the operation if the next magazine tube to enter into the dispensing position contains a single-serving capsule with the desired contents. In this case, registration of the respective position of a defined magazine tube via a logical control system can be omitted, since the scanner located in front of the dispensing position is able to convert the entrance of a selected magazine tube into a control signal via a controlling device for the drive of the magazine table, so as to stop the movement of the magazine table in time once the selected magazine tube containing the desired coffee type enters the dispensing position. Only one scanner located in front of the dispensing position is sufficient in this case as long as the drive of the magazine table allows for only one direction of rotation or shifting. However, if two opposite directions of rotation or shifting for the entrance of a randomly-selected magazine tube on the shortest possible path into the dispensing position are possible, then both sides of the dispensing position must be equipped with a scanner each.

Preferably, the magazine and the capsule conveying device interact with a compact brewing unit according to claim 13, whereby the brewing unit includes a spindle piston, actuated via an electric motor and able to be vertically adjusted via rotation. The spindle piston is provided with an inner brewing chamber insert with a downward-projecting piercer for piercing the capsule, whereby the piercer also contains brewing water supply channels. The spindle piston can be lowered via rotation into a brewing position towards a capsule ejector able to swivel and towards a plate with pyramid-shaped projections. A capsule ejection lever engaging with the spindle piston serves to swivel the capsule ejector upwards into an ejection position by raising the spindle piston once the brewing process is finished. Thus the spindle piston is able to assume three positions via rotation, i.e. a receiving position for the single-serving capsule that is pushed horizontally with its base or an outer bulge facing downwards into the space between the spindle piston and the pyramid plate, a brewing position where the brewing chamber is closed by the tight fit of the brewing chamber placed onto the pyramid plate with the capsule ejector, and finally an ejection position where the spindle piston is raised to its highest position, thus operating the capsule ejector.

According to claim 14, this brewing unit with a replaceable pyramid plate and with the capsule ejector on a pyramid support drawer able to be pulled out of the brewing unit may preferably form a basic unit assembly group.

Ejection of the used single-serving capsule occurs automatically when the parallel-guided spindle piston is raised, whereby the capsule ejection lever guided in a sliding manner laterally grips the capsule ejector on one side. This results in the reliable ejection of the single-serving capsule, from the free space between the capsule ejector and the raised brewing chamber insert, from the now open brewing chamber, without any direct manual manipulation of the single-serving capsule.

For the accurate centering of the single-serving capsule prior to the brewing process, the upper surface of the capsule ejector positioned above the pyramid plate is equipped with a capsule centering device able to interact in particular with the outer bulge of the capsule.

The single-serving capsule is guided via its outer bulge in a similar manner along the horizontal capsule slide path between the magazine and the brewing unit, via lateral capsule guides located in succession to the capsule ejector guides, whereby the capsule slide path is part of the brewing unit.

A design type of the invention is further described below by means of the drawing with five Figures, which may result in further characteristics and advantages of the invention.

Figure 2:
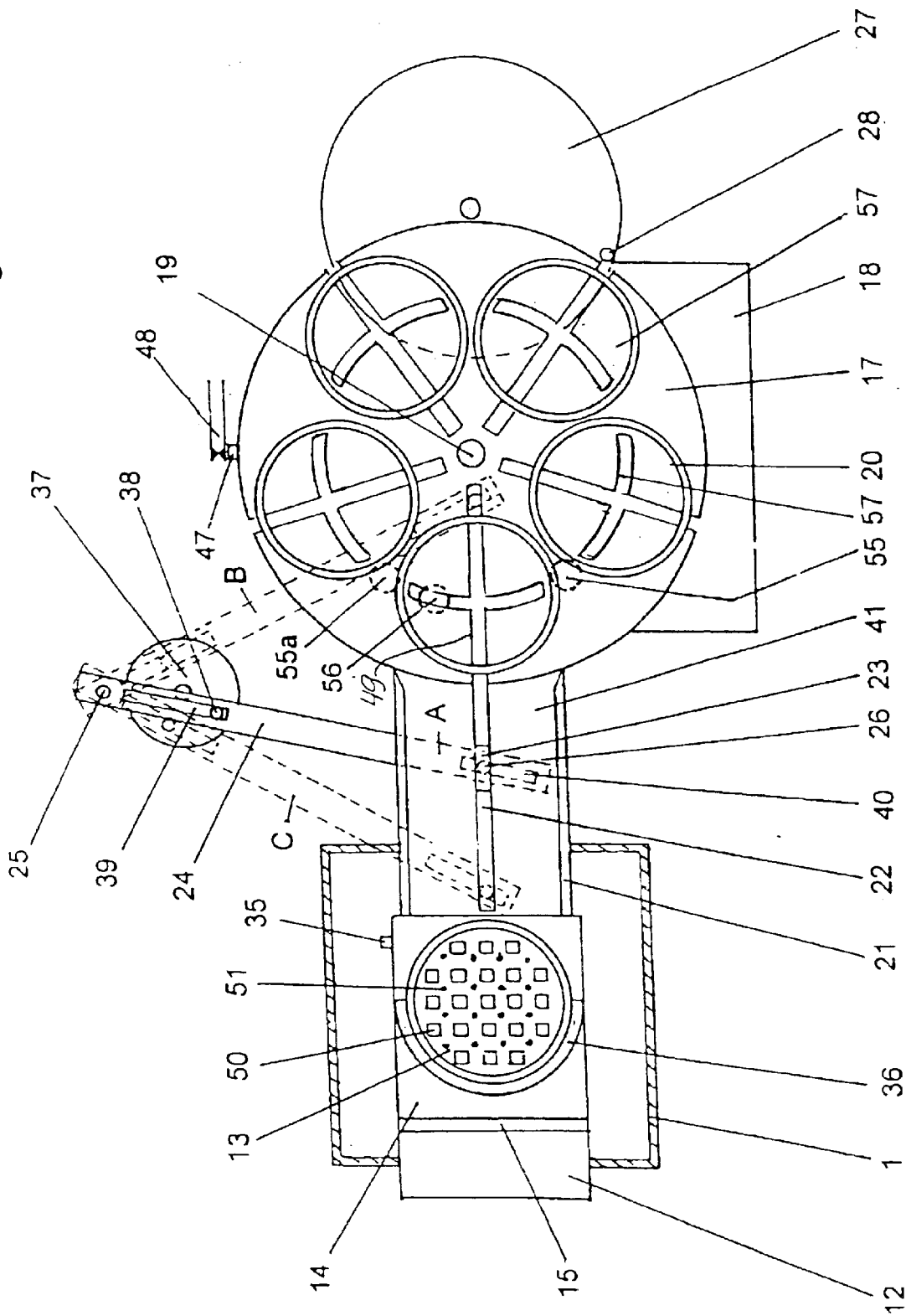
Figure 3A:
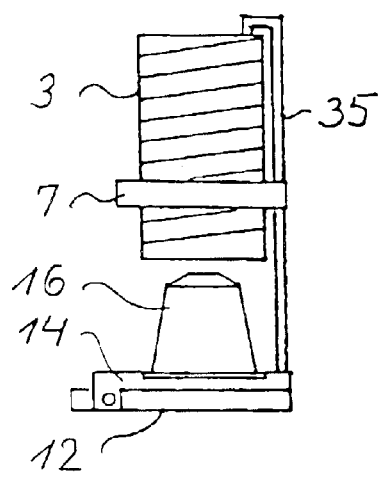
Figure 3B:
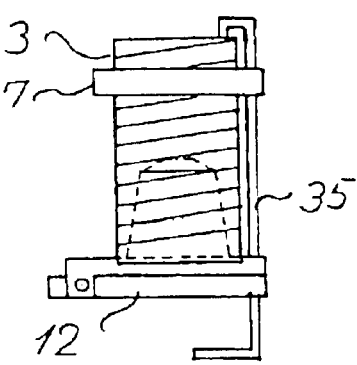
Figure 3C:
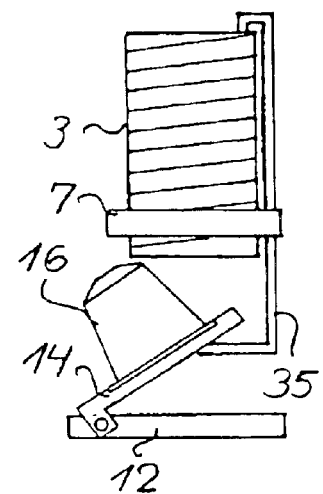

FIG. 1 shows a lateral view in partial cross-section of an essential part of the espresso brewing device with a brewing unit and a magazine as well as a capsule conveying device located between them, FIG. 2 shows a plan view in partial cross-section of the essential part of the espresso brewing device according to FIG. 1, FIG. 3a shows as a detail of the brewing unit a spindle piston in a receiving position for a single-serving capsule, FIG. 3b shows the spindle piston in a brewing position, and FIG. 3c shows the spindle piston in an ejection position of the used single-serving capsule.

The magazine storing assorted stacks of single-serving capsules containing various coffee types essentially includes a magazine table 17 swivel-mounted inside a magazine plate drawer 18 via a magazine pivot 19 in such a way that it can be removed easily, i.e. preferably without using tools. The upper surface of magazine table 17 is equipped with five magazine tubes 20 arranged along the circumference of magazine table 17. Each magazine tube 20 is designed to hold a stack of single-serving capsules 16 with their bottom membranes facing downwards, i.e. to hold magazine capsules 16 sorted according to the coffee type contained therein, whereby each magazine tube 20 only sores capsules containing one type of coffee.

The magazine drawer 18 is guided on parallel guiding elements 46 so that it is able to slide, i.e. so that it can be drawn out of the espresso brewing device. The guiding elements 46 project upwards from a support frame 45 which also serves to support the brewing unit and the capsule conveying device located between the magazine and the brewing unit.

A Maltese-cross-type driving device with a driving motor 30 actuating a Maltese-type disc 27 is provided for the detachable, precise actuation of magazine table 17. A driving pin 28 protrudes upwards from the Maltese-type disc, whereby the driving stud is able to reach its intended position via one of several Maltese-type gripping flanks 58 located at the lower surface of magazine table 17 when the latter is in its operational position with the magazine table drawer inserted into the magazine table. The Maltese-cross-type drive serves to shift the magazine table 17 step by step in such a way that one of the magazine tubes 20 is in the exact position for dispensing one of the stacked single-serving capsules 16, in this case the magazine tube rotated furthest to the left, i.e. closest to the brewing unit. The dispensing position is also termed removal position.

In order to dispense the lowest of the stacked single-serving capsules 16 from the magazine tube 20 in the dispensing position, each magazine tube 20 has a capsule magazine opening 33 open towards the outside, through which the lowest magazine capsule can be pushed out from the magazine tube 20. A capsule gripper 23 serves to push out the capsule, whereby the gripper 23 engages with and is guided in a sliding manner within a radially extending capsule ejection slot 49, open towards the outside, that is located below each magazine tube 20. The capsule conveying device associated with the capsule gripper is further described below.

For the purpose of controlling the setting of the magazine table 17, the circumference of the magazine table 17 is provided with a zero setting reference mark 47 able to be scanned via a stationary scanning contact 48. For each of the two possible rotation directions of the magazine table 17, additional scanners 55, 55a are positioned below the turntable in front of the dispensing position. Alternatively, a sensor 56 may be provided below the dispensing position. Each scanner 55, 55a consists of a scan transmitter and an encoder receiver of an optic scanner beam, whereby the encoder receiver is designed for the decoding a code applied to the base or bottom membrane of the single-serving capsules 16. A receiver of sensor 56 may be of a simpler design, since it merely needs to register the presence or absence of a single-serving capsule. For this purpose encoding of the capsules is not necessary. However, the code may contain further information, particularly with regard to the contents or the coffee type of the single-serving capsule and/or concerning the manufacturer.

As shown in FIG. 2, the magazine table 17 is provided in the area below the magazine tubes 20 with windows 57 shaped as arched sections, so that the scanners 55, 55a, or the sensor 56 are able to scan the bottom membrane of the single-serving capsules.

The capsule conveying device actuating the capsule gripper consists of a capsule-conveying driving motor 32 with a drive mechanism 31 equipped with a driving disc 37 provided with a driving stud 38, cf. FIG. 1. The driving stud 38 engages with a driving stud slot 39 of an actuating lever 24 positioned below the plane of the magazine disc 17, whose end not provided with driving stud slot 39 is provided with a capsule gripping slot 40. A gripping pin 26 of the capsule gripper 23 engages with capsule gripper slot 40. At its end adjacent to the driving stud slot, the actuating lever 24 is swivel-mounted at a rotation bearing 25 in order to assume the positions A, B and C represented by dotted lines in FIG. 2, whereby A is the position at rest
B is the position of preparing for the ejection of a single-serving unit from a magazine tube in the ejection position
C is the final position during insertion of the single-serving capsule into the brewing unit.

The brewing unit, shown in its entirety on the left of FIG. 1, includes a casing base 1 with a pyramid-carrying drawer 12 not shown in any detail in FIG. 1. A replaceable pyramid plate 13 is placed upon the frame-shaped pyramid-carrying drawer 12 in such a way that it cannot move laterally, as well as a frame-shaped capsule ejector 14, swivel-mounted around a hinge 15 at the pyramid-carrying drawer 12. The capsule ejector 14 is equipped with a capsule centering device 36, and with a capsule slide path 41 connecting the brewing unit with the magazine table, i.e. positioned closely adjacent to the edge of the magazine table with practically no gap existing, cf. FIG. 2. The capsule slide path 41 is provided with a central capsule gripper 22, and with two capsule guides 21, whereby one each is positioned at the edge of the capsule slide path next to the capsule gripper.

The brewing unit is also supported by the support frame.

The brewing unit further includes an upper casing 2 supporting a spindle piston 3 with a 3-gear spindle 4, a spindle piston parallel guide 11 and a spindle piston drive.

The spindle piston drive consists of a driving motor 10, a drive mechanism 9 with a drive pinion 8 engaging with an outer gear tooth system of a spindle piston drive gear 7. The latter is equipped with an inner gear tooth system corresponding to the 3-gear spindle 4.

A control system not shown here, such as an electro-optical encoder control system, serves to control the spindle piston drive, controlling the adjustment of the spindle piston 3 to its three operating positions shown in FIGS. 3a, 3b and 3c.

A brewing chamber insert 5 is inserted into a lower section of spindle piston 3, whereby the upper part of insert 5 is equipped with a capsule piercer 6 pointing downwards containing brewing water supply channels 42 that are connected to a flexible brewing water supply tube.

The upper part of spindle piston 3 is equipped with a gripping ring 43, whereby a capsule ejection lever 35, suspended from gripping ring 43, is coupled at its lower end with the capsule ejector 14 via a coupling element not shown here.

The functional cycle of the described espresso brewing device is as follows:

The magazine table drawer 18 is manually pulled out of the support frame 45, and the magazine tubes 20 are stocked manually as well with the single-serving capsules 16. For this purpose, the magazine table 17 with the magazine tubes 18 should preferably be separated from the magazine table drawer 18. If various types of coffee are available for selection, each type is inserted into a different magazine tube associated with one type of coffee to simplify identification. Once the capsule magazine has been filled, it is pushed back into the guiding elements 46 of the support frame 45. During the stand-by operation of the espresso machine the magazine table 17 with the magazine tubes 20 rotates automatically around its pivot 19 by means of a Maltese-cross-type drive 27, 28, 29, 30 and the Maltese-type gripping flanks 58 into the zero position predetermined by its zero setting cam 47 and the associated stationary control contact 48. When the espresso machine is switched off, this process is carried out once the machine is switched on. The magazine tubes are numbered according to their quantity. The stocking of each magazine tube with the various types of coffee can be programmed and recalled when required by means of these numbers via a control panel. The process of finding the recalled magazine tube is carried out as follows: the number of steps performed by the magazine table, starting from the zero position, is counted and stored by an electronic encoder unit and a memory unit, i.e. a meter. The circuit is designed in such a way that the magazine table always takes the shortest possible path to reach the selected position, and the counting of the steps is therefore carried out in an additive as well as a subtractive manner. The encoder signal may be transmitted either via a Maltese-cross-type drive or via the rotating magazine unit, i.e. the magazine table 17 with the magazine tubes. Once the machine has been switched off or following a power failure, the position memory of the memory unit is deleted. When the machine is switched on again the magazine table 17 automatically assumes the zero position, as described above. For the purpose of driving the magazine table 17, the Maltese-type drive 27 carries out one complete rotation for every step taken by the magazine table. During the passage of the capsule, the sensor 58, positioned below or along the circumference of the capsule magazine unit, verifies the presence of a single-serving capsule 16 in the selected magazine tube as son as the latter is in the ejection position. For this purpose coding of the single-serving capsules 16 is not necessary. If the single-serving capsules are provided with a code concerning their content or with an additional code concerning the manufacturer, the codes applied to the bottom membranes of the single-serving capsules 16 can be read by a scanner 55 or 55a located below the magazine table 17 before the dispensing position with regard to the direction of rotation via a transparent window 57. In this case the spot check "capsule present" and thus sensor 56 can be omitted.

When the magazine table 17 has reached the selected position, conveyance of the capsule begins so as to convey the selected single-serving capsule 16 into the brewing unit. For this purpose the driving motor 32 starts operation, swivelling the actuation lever 24 from its rest position A into the starting position B by means of the driving disc 37 and the associated driving stud 38 positioned in the driving stud slot 39 of the actuating lever 24. Meanwhile the capsule gripper 23, mounted in a sliding manner within capsule gripping guide 22, is pushed via its gripping stud 26 located within the capsule gripping slot 40 of the actuation lever 24, under the lowest single-serving capsule of the selected magazine tube 20 and further along up to the starting position B for the conveying purposes about to occur. During conveyance the actuation lever 24 is brought into position C via its driving elements, and the capsule is thus conveyed via the capsule gripper 23 along the capsule sliding path 41 that is limited laterally by the capsule guides 21 into the brewing unit. After conveyance is completed, the actuation lever returns to its starting position A.

After being conveyed to the brewing unit, the single-serving capsule 16 is in the brewing position, whereby the capsule, having been centered via capsule centering device 36 that is part of capsule ejector 14, is positioned on the capsule ejector 14 via its outer bulge 53 and above the pyramid plate 13. The capsule ejector consists of a plate, connected via hinge 15 with the pyramid drawer 12, having a circular central recess whose diameter corresponds to that of the single-serving capsule 16 without its outer bulge 53, and of the capsule centering device 36 as well as the coupling element connecting ejector 14 with the capsule ejection lever 35 in such a way that they can be separated. The pyramid support drawer 12 is designed as an element able to be drawn out of the brewing unit and forms a basic unit assembly group together with the replaceable pyramid plate 13 mounted within and the capsule ejector. In order to replace or to clean the pyramid plate, the pyramid drawer 12 can be pulled out of the brewing unit, whereby the connection to the capsule ejection lever 35 is interrupted via the coupling element.

Prior to the brewing process the spindle piston 3 is in its starting position according to FIG. 3a. Once the single-serving capsule is inside the brewing unit, the spindle piston 3 is lowered in a linear manner into the brewing position according to FIG. 3b during the course of the automatic process as follows: searching operation of the magazine table 17, conveying of the capsule 16 into the casing base 1 of the brewing unit and positioning of the centering device 36 of the capsule ejector 14, whereby the spindle piston 3 is lowered via the actuated spindle piston driving gear 7 and its inner gear tooth system engaging with the 3-gear spindle gearing worm 4 via the parallel guide 11 engaging with the spindle gearing worm 4. During this process the upper surface of the single-serving capsule 16 is pierced by the capsule piercer 6 so that subsequently the brewing water is able to flow into the capsule at a pumping pressure of 10 to 15 bar and a temperature of approximately 96° C. via the flexible water supply tube 34 and the brewing water supply channels 42 located inside capsule piercer 6. Thus the coffee powder contained in the capsule is moistened and put under pressure. Only when an inner capsule pressure of approximately 6 bar has been reached, the membrane forming the base of the capsule is pressed against the pyramid-shaped profile 50 of the contoured plate 13 and the membrane is pierced. Thus the brewing water can permeate the coffee powder and flow out via the draining holes 51 of the pyramid plate 13 and the outlet opening 44 of the brewing unit. During the brewing process the lower edge of the brewing chamber insert serves as a pressure-resistant watertight seal by pressing the single-serving capsules with their outer bulge 53 against the upper surface of the capsule ejector.

After completion of the brewing process whose length can be controlled via preprogramming according to coffee type or beverage type, such as espresso or breakfast coffee, the spindle piston 3 is brought into the position according to FIG. 3c via its driving elements. For this purpose the capsule ejector 14 is swivelled upwards around the rotational axis of its hinge 15 via the capsule ejection lever 35 suspended from the upper inner spindle piston gripping ring 43 connected via the coupling element with capsule ejector 14, and the single-serving capsule 16 is ejected from the brewing unit. Subsequently the spindle piston return automatically to its starting position according to FIG. 3a.

The drawings show only those parts and basic unit assembly groups that are necessary for the process and for the understanding of the process and the various functions, represented schematically in a simplified manner.

| List of Reference Numbers: | |
|---|---|
| 1 | casing base |
| 2 | upper casing |
| 3 | spindle piston |
| 4 | 3-gear spindle |
| 5 | brewing chamber insert |
| 6 | capsule piercer |
| 7 | spindle piston drive gear |
| 8 | drive pinion |
| 9 | drive mechanism |
| 10 | motor |
| 11 | spindle piston parallel guide |
| 12 | pyramid-supporting drawer |
| 13 | pyramid plate |
| 14 | capsule ejector |
| 15 | ejection hinge |
| 16 | single-serving unit |
| 17 | magazine table |
| 18 | magazine table drawer |
| 19 | magazine table pivot |
| 20 | magazine tubes |
| 21 | capsule guide |
| 22 | capsule gripping guide |
| 23 | capsule gripper |
| 24 | actuating lever |
| 25 | rotation bearing |
| 26 | gripping stud |
| 27 | Maltese-type disc |
| 28 | Maltese-type disc pin |
| 29 | drive mechanism |
| 30 | motor |
| 31 | drive mechanism |
| 32 | capsule-conveying driving motor |
| 33 | capsule magazine opening |
| 34 | flexible water supply tube |
| 35 | capsule ejection lever |
| 36 | capsule centering device |
| 37 | driving disc |
| 38 | driving stud |
| 39 | driving stud slot |
| 40 | capsule gripping slot |
| 41 | capsule slide path |
| 42 | brewung water supply channels |
| 43 | gripping ring |
| 44 | espresso outlet opening |
| 45 | support frame |
| 46 | guiding elements |
| 47 | zero setting reference mark |
| 48 | scanning/control contact |
| 49 | capsule ejection slot |
| 50 | pyramid contours |
| 51 | draining holes |
| 52 | — |
| 53 | capsule bulge |
| 54 | edge of brewing chamber insert |
| 55, 55 | scanner for monitoring capsule contents |
| 56 | sensor for monitoring presence of capsule |
| 57 | sensor/scanner window |
| 58 | Maltese-type gripping flanks. |

What is claimed is:

1. Espresso brewing device with a brewing unit, with a magazine able to rotate via an electric motor and provided with a magazine table (17) supporting several magazine tubes (20), located along its circumference and open below, for holding single serving capsules (16) containing coffee powder, and with means for dispensing the single-serving capsules individually into the brewing unit, whereby a control system is provided for controlling the rotation of the magazine up to the point where a magazine tube containing the desired coffee type is in the dispensing position, characterised by the fact that the brewing unit, the capsule conveying device and the magazine are positioned on a support frame (45) and that the magazine is supported by a magazine table drawer (18) mounted on the support frame and able to be pulled out.

2. Espresso brewing device according to claim 1, characterised by the fact that the magazine table (17) with the magazine tubes can be separated from the drawn-out magazine table drawer (18).

3. Espresso brewing device according to claim 1, characterised by the fact that the magazine tubes (20) are each provided, in a lower section of their jacket located above the magazine table (17), with a capsule magazine opening (33) radially open towards the outside and serving as a passage for the lowest-positioned single-serving capsule (16) stored with its base facing downwards inside a magazine tube (20) whereby the capsule is pushed-out through the passage via an electromotive-actuated capsule gripper (23) when the magazine tube is in the dispensing position, and by the fact that a capsule sliding path (41) extends between the magazine table and the brewing unit whereby the pushed-out single-serving capsule (16) is able to slide further towards the brewing unit via the capsule gripper (23).

4. Espresso brewing device according to claim 3, characterised by the fact that a capsule ejection slot (49) extending radially up to the outer edge of the magazine table (17) and open in that area is formed below each magazine tube (20), whereby the capsule ejection slot (49) meets a capsule gripping guide (22), formed from the capsule slide path (41) and extending up to the brewing unit, when one of the magazine tubes (20) is in the dispensing position, and by the fact that the capsule gripper (23) is guided, as part of a capsule conveying device, in a sliding manner within the capsule gripping guide (22) and the adjoining capsule ejection slot.

5. Espresso brewing device according to claim 4, characterised by the fact that the capsule gripper (23) is connected inside the capsule conveying device with a capsule conveying driving motor (32) via an actuating lever (24) and drive mechanism elements (31, 37, 38, 40).

6. Espresso brewing device according to claim 1, characterised by the fact that the magazine is essentially positioned adjacent to the brewing unit and that the capsule conveying device is designed only for the horizontal conveyance of the single-serving capsules (16) and is essentially positioned between the magazine and the brewing unit.

7. Espresso brewing device according to claim 1, characterised by the fact that the magazine table (17) is in an actuation-connection with a Maltese-cross-type drive including a driving motor (30), a drive mechanism (29), a Maltese-type disc (27) with a driving pin (28) and positioned below the magazine table on the support frame, and by the fact that the driving pin (28) is in close touch with one of several Maltese-type gripping flanks (58) located at the lower surface of the magazine table (17).

8. Espresso brewing device, especially according to claim 1, characterised by the fact that the magazine table (17) is provided with a zero setting reference mark (47) able to be scanned.

9. Espresso brewing device according to claim 8, characterised by the fact that the magazine table (17) is provided with an electronic position recognition device consisting of a scanner of the zero setting reference mark (47) and a two-direction meter counting operational steps carried out by the Maltese-type drive in each direction of rotation starting from a zero setting of the magazine table (17), whereby the position recognition device is part of a logical control system controlling a set movement of a randomly selected magazine tube using the shortest possible path into the dispensing position.

10. Espresso brewing device, according to claim 1, characterised by the fact that the magazine table (17) is provided in the area below each magazine tube (20) with a transparent window (57) for scanning the base of a single-serving capsule (16), and by the fact that at least one sensor/scanner (55, 56) is positioned below the magazine table (17) at the path of movement of the transparent windows able to rotate together with the magazine table (17) and is directed towards the path of movement of the respective window.

11. Espresso brewing device according to claim 1, characterised by the fact that a sensor (56) is located in the dispensing position for the purpose of monitoring the presence of a single-serving capsule (16).

12. Espresso brewing device, especially according to claim 1, characterised by the fact that a scanner (55) is positioned before the dispensing position in the direction of rotation of the magazine table (17), whereby a code concerning the coffee type applied to the base of the lowest single-serving capsule (16) inside one of the magazine tubes (20) can be scanned.

13. Espresso brewing device, according to claim 1, characterised by the fact that the brewing unit includes a spindle piston (3) driven by an electric motor and provided with an inner brewing chamber insert (5) having a piercer pointing downwards equipped with inner brewing water supply channels (42) whereby the spindle piston (3) can be lowered into a brewing position (FIG. 3*b*) towards a capsule ejector (14) able to swivel and a pyramid plate (13), and by the fact that a capsule ejection lever (35) engages with the spindle piston (3) whereby the capsule ejector (14) can be swivelled upwards into an ejection position (FIG. 3*c*) via raising the piston spindle (3) after completion of a brewing process.

14. Espresso brewing device according claim 13, characterised by the fact that the pyramid plate (13) is replaceable and, together with the capsule ejector (14) on a pyramid support drawer (12), forms a basic unit assembly group.

15. Espresso brewing device according to claim 13, characterised by the fact that the upper surface of the capsule ejector (14) is provided with a capsule centering device into which one of the single-serving capsules can be inserted horizontally.

16. Espresso brewing device according to claim 3, characterised by the fact that the horizontal capsule sliding path (41) is equipped with lateral capsule guides (21) and is part of the brewing unit.

\* \* \* \* \*